(12) United States Patent
Popilka et al.

(10) Patent No.: US 9,881,193 B2
(45) Date of Patent: Jan. 30, 2018

(54) METHOD FOR READING A TWO-DIMENSIONAL CODE BY MEANS OF A CAMERA USED FOR THREE-DIMENSIONAL OPTICAL MEASUREMENT OF OBJECTS

(71) Applicant: DENTSPLY SIRONA Inc., York, PA (US)

(72) Inventors: Bjorn Popilka, Hemsbach (DE); Gerrit Kocherscheidt, Walldorf (DE)

(73) Assignee: Dentsply International Inc., York, PA (US)

( * ) Notice: Subject to any disclaimer, the term of this patent is extended or adjusted under 35 U.S.C. 154(b) by 0 days.

(21) Appl. No.: 15/101,447

(22) PCT Filed: Dec. 4, 2014

(86) PCT No.: PCT/EP2014/076486
§ 371 (c)(1),
(2) Date: Jun. 3, 2016

(87) PCT Pub. No.: WO2015/082580
PCT Pub. Date: Jun. 11, 2015

(65) Prior Publication Data
US 2016/0307016 A1    Oct. 20, 2016

(30) Foreign Application Priority Data
Dec. 4, 2013   (DE) ................. 10 2013 224 930

(51) Int. Cl.
*G06K 9/00* (2006.01)
*G06K 7/14* (2006.01)
(Continued)

(52) U.S. Cl.
CPC ........ *G06K 7/1447* (2013.01); *G01B 11/0608* (2013.01); *G01B 11/25* (2013.01);
(Continued)

(58) Field of Classification Search
CPC ...... G06F 3/011; G07F 17/32; G07F 17/3209; A63F 2300/1093; A63F 2300/201; A63F 2300/204; A63F 2300/6045; G06K 9/0037; G06K 9/00201; G06K 9/00442; G06K 9/4604; G06K 9/4661; G06K 19/06028
See application file for complete search history.

(56) References Cited

U.S. PATENT DOCUMENTS 7,545,722 B2 * 6/2009 Ito .................. G06K 7/10722
                                                235/462.01
2012/0330769 A1 * 12/2012 Arceo ............... G06Q 20/4014
                                                705/21
(Continued)

*Primary Examiner* — Ali Bayat
(74) *Attorney, Agent, or Firm* — David A. Zdurne; Douglas J. Hura; Leana Levin

(57) ABSTRACT

Disclosed is a method for reading a two-dimensional code (17) by means of a camera (1) used for the three-dimensional optical measurement of an object using triangulation. Said method comprises the steps of placing the camera (1) above the two-dimensional code (17), having a white light source (5) of the camera (1) illuminate the code (17), having the camera (1) capture an image (18) of the code (17), and having an arithmetic unit (6) read data encrypted in the code (17) from the image (18) of the code (17).

5 Claims, 2 Drawing Sheets

(51) Int. Cl.
*G01B 21/04* (2006.01)
*G01B 11/06* (2006.01)
*G01B 11/25* (2006.01)
*G06T 7/80* (2017.01)
*G06T 7/521* (2017.01)

(52) U.S. Cl.
CPC ......... *G01B 21/042* (2013.01); *G06K 7/1417* (2013.01); *G06T 7/521* (2017.01); *G06T 7/85* (2017.01)

(56) References Cited

U.S. PATENT DOCUMENTS

2012/0330844 A1* 12/2012 Kaufman ............ G06Q 20/027 705/67
2015/0002395 A1* 1/2015 Romano ................ G06F 3/033 345/157

* cited by examiner

METHOD FOR READING A TWO-DIMENSIONAL CODE BY MEANS OF A CAMERA USED FOR THREE-DIMENSIONAL OPTICAL MEASUREMENT OF OBJECTS

TECHNICAL FIELD

The invention relates to a method for reading a two-dimensional code by means of a camera for three-dimensional optical measurement of an object using triangulation.

BACKGROUND OF THE INVENTION

Cameras for three-dimensional measurement of objects using triangulation, as used, for example, for measuring teeth or imperfections in dental medicine, must be calibrated before the first use or even regularly. For this purpose, calibration sets, for example, are used that comprise a carrier on which markers are arranged in precisely known positions. For calibration, this calibration target, i.e., the carrier with the markers, can be positioned and captured in various positions relative to the camera. The camera is calibrated using the image and the precisely known positions of the markers on the carrier or relative to each other.

Because the positions of the markers on the carrier can fluctuate somewhat for reasons relating to production and the positions of the markers are therefore not known with sufficient precision to perform a proper calibration, each of the calibration sets is usually measured precisely before they can be used and the results are stored in a database.

If a calibration set is used to calibrate a camera, the precise positions of the markers can be checked in the database in advance, for example, using a serial number of the calibration set.

However, reading, entering or searching for the serial number or any other identification/code in the database is a source of error.

The object of the present invention is to avoid this source of error.

SUMMARY OF THE INVENTION

This object is achieved using a method for reading a two-dimensional code by means of a camera for three-dimensional optical measurement of an object using triangulation. The method comprises the following method steps: The camera is positioned above the two-dimensional code. The code is illuminated by means of a white light source of the camera. Using the camera, an image of the code is captured and the code is recognized or read within the image by means of an arithmetic unit.

Cameras for the three-dimensional measurement of an object using triangulation are based on scanning the object with light, an illumination beam path and an observation beam path enclosing an angle. The measurement or scanning can be done point by point or also two-dimensionally. A special form of triangulation is, for example, the phase-shifting method, in which a pattern, for example, a striped pattern, is projected onto an object in different positions or phases and captured in order to determine a height profile for the object. In order to depict the obtained height profile or 3D data in true color and/or with natural texture, at least one additional image of the object is frequently captured where no pattern is projected onto the object, the object being illuminated with a white light source, for example, a white light LED. Because monochromatic light is often used for triangulation, cameras frequently additionally have at least one white light source in such cases.

For the reading according to the invention, the camera is essentially used as a photo camera in order to determine the content or the encrypted data of the code from an image of the code. This makes it possible, for example, to avoid a user reading a serial number and entering said serial number into an arithmetic unit or searching a database.

The code can, for example, be a matrix code, e.g. a QR code (quick response code), which comprises a square matrix of, for example, black and white points and represents the encoded data, for example, using binary code. The code can of course also be depicted in other colors or color combinations.

Any other form of a two-dimensional code can also be used, for example, a bar code or a point code.

The code could also be, for example, a serial number that is captured by means of the camera and recognized by means of text recognition software, e.g., OCR.

The code can either contain data or information determined directly, e.g., calibration data, or represent a code number, such as a serial number, under which certain information or data is stored in a database. This also depends on the size of the code and the size of the camera's capture area.

The code is advantageously arranged on a calibration set for the camera and the data encrypted in the code is either calibration data coming directly from the camera or a code number, by means of which calibration data of the camera is identified in a database.

To calibrate cameras based on triangulation, calibration sets are frequently used that typically have an inner calibration tube, an outer calibration tube and a calibration cover, a calibration label, for example, being arranged on an upper side of the inner calibration tube. The upper section of the outer calibration tube typically has an opening on its side through which a camera can be inserted at least partially into the outer calibration tube and arranged above the calibration label on the inner calibration tube in such a way that the calibration label can be captured by means of the camera. The calibration cover typically also has a recess into which the camera can be at least partially inserted for exit window calibration.

The two-dimensional code can be arranged at different positions on the calibration set. For example, the code can be arranged on an outer wall of the calibration set. The camera must then be held above the code, for example, freehand, while the code is being captured. The code can, for example, also be arranged below the calibration label. Because of this, the position of the camera through the opening in the outer calibration tube is supported or ensured while the code is being captured. However, this is only possible if there is enough space for the code next to the calibration label and it can be ensured that the camera can captured said code in the position in which it is inserted into the opening. The code can also be arranged on a wall of the recess in the calibration cover, the position of the camera in this case being at least supported or even ensured by the recess in the calibration cover while the code is being captured.

Whether the code directly contains the calibration data or represents a code number can, for example, be dependent on the size of the code, the possible size of the code in turn being dependent on the position of the code on the calibration set as well as on the size of a capture area of the camera.

The code is advantageously a binary code. Binary codes constitute a typical set of two-dimensional codes. The code can, for example, be a matrix code, e.g., a QR code, or a bar code.

Advantageously, a pattern is projected onto the code at alternating times during a recording interval or said code is illuminated with the white light source and an image is captured each time, only images of the object illuminated with the white light source being used to read the code.

Cameras used for the three-dimensional measurement of objects using triangulation frequently have a capture mode that provides alternating triangulation images with a projected pattern and white light images without a pattern, i.e., essentially photographic images. This capture mode makes it possible to generate 3D images of objects in true color.

Because of the selective use of only such images in which the object is illuminated with white light and no pattern is projected, this common capture mode can also be used to read the code.

Advantageously, at least a first and a second image of the code illuminated with white light are captured simultaneously or successively in time, only light of a first wavelength or a first wavelength range being detected for the first image and only light of a second wavelength or a second wavelength range being detected for the second image.

The selective detection of different wavelengths makes it possible to read a code that comprises or contains a plurality of codings in different colors. Such a code can, for example, comprise a first two-dimensional binary code, which is, for example, shown in the color red, a second two-dimensional binary code shown in green and a third two-dimensional binary code shown in blue, the first, second and third code being locally arranged above one another. Such a code can accordingly contain or reproduce significantly more information per surface area.

Depending on the type of sensor the camera has, the different codes can be detected consecutively or simultaneously. For example, three codes shown in three different colors can be read simultaneously by means of three sensors for these three different colors.

Advantageously, the camera is brought into a position at a distance to an outer wall of the calibration set to position it above the code.

A simple arrangement of the code is on an outer wall of the calibration set. In order to read the code, the camera can then simply be brought up to the wall of the calibration set in this region. A small size should be chosen for the code here to make it as easy as possible to detect the entire code with one image.

The camera is advantageously inserted at least partially into an opening or a recess of the calibration set to position it above the code.

Arranging the code on an inner wall of the calibration set, to which the camera can be brought by inserting it into an opening or recess of the calibration set, facilitates capturing the code by means of the camera.

Depending on the design of the opening, the part of the camera inserted into the opening can be guided to ensure the precise positioning of the camera above the code and that the camera remains still during imaging.

BRIEF DESCRIPTION OF THE DRAWINGS

The method according to the invention is explained in reference to the drawings. In the drawings.

DETAILED DESCRIPTION OF THE INVENTION

Figure 1:
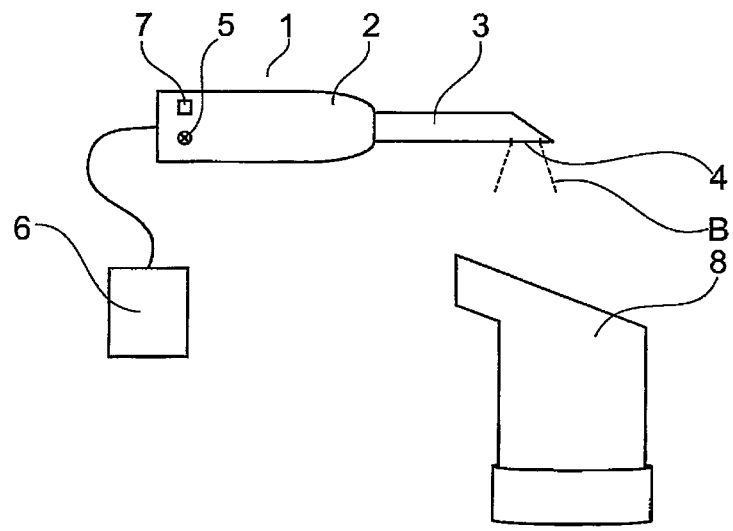
FIG. 1 shows a camera and a calibration set.

A sketch of a camera 1 for the three-dimensional optical measurement of an object using triangulation is shown in FIG. 1. The camera 1 comprises a handle 2 and a head part 3, at the end of which an exit window 4 is arranged. An illuminating beam can escape through the exit window 4. Furthermore, light that is reflected back by an object can enter the camera again as an observation beam and can be detected by same.

The camera 1 has at least one white light source 5, such as a white light LED, and is connected wirelessly or via a cable at least to one arithmetic unit 6, a detector 7 arranged in the camera 1 transmitting detected data to the arithmetic unit 6. To calibrate the camera 1, a calibration set 8 can be used, a sketch of which is also shown in FIG. 1.

Figure 2:
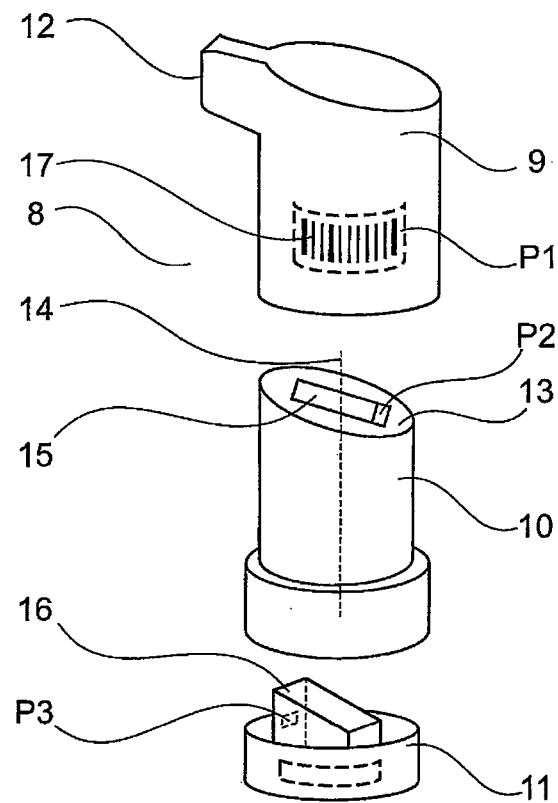
FIG. 2 shows a calibration set.

The design of the calibration set 8 is shown in FIG. 2. The calibration set 8 has an outer calibration tube 9, an inner calibration tube 10 and a calibration cover 11.

The outer calibration tube 9 has an opening 12 into which the camera head 3 can be inserted. The width and height of the opening 12 can, for example, essentially correspond to the circumference of the camera head 3 and be deep enough that an inserted camera head 3 can be held or at least somewhat supported by the opening 12.

The inner calibration tube 10 has a top surface 13, which, as shown for example in FIG. 2, can be diagonally aligned with respect to a longitudinal axis 14 of the inner calibration tube 10. A calibration label 15 is arranged on the top surface 13.

The calibration cover 11 has a recess 16 that extends into the inner calibration tube 10 when the calibration set 8 is in an assembled state. The recess 16, for example, has essentially a negative form of the camera head 3 such that the latter can be inserted into the recess 16.

The code 17 can, for example, be arranged at one of the positions P1, P2 or P3 shown in FIG. 2 on an outer wall of the outer calibration tube 9, on the top surface 13 of the inner calibration tube 10 or on a surface of the recess 16 of the calibration cover 11.

Figure 3:
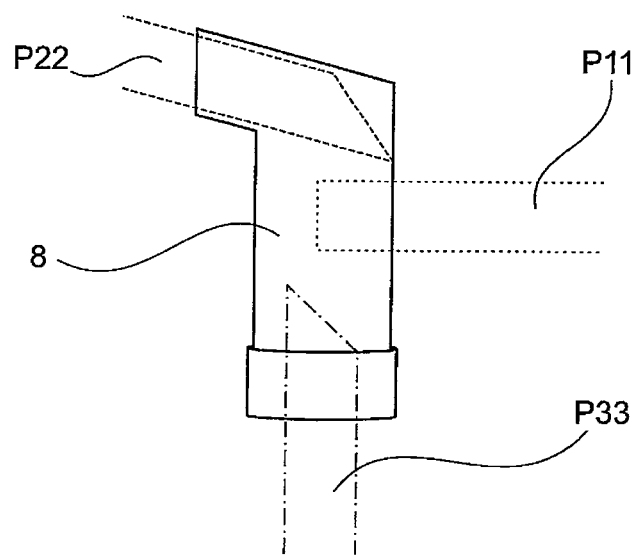
FIG. 3 shows a positioning of the camera.

The camera 1 is positioned above the code 17 according to the invention. Depending on the arrangement of the code 17, for example on the calibration set 8, the camera head 3 of the camera 1 is, for example, held in the position P11 above a side wall of the calibration set 8, as shown in FIG. 3 using the dotted depiction of the head part 3 of the camera 1. If the code is, for example, arranged in position P2 on the top surface 13 of the inner calibration tube 10, the head part 3 of the camera 1 is moved into the position P22 in the opening 12 of the outer calibration tube 9, as shown in FIG. 3 with a dashed line. If the code 17 is, for example, arranged in position P3, i.e., in the recess 16 of the calibration cover 11, the camera head 3 is moved into the position P33 in the recess 16 of the calibration cover 11, as shown in FIG. 1 with a dashed and dotted line.

Figure 4:
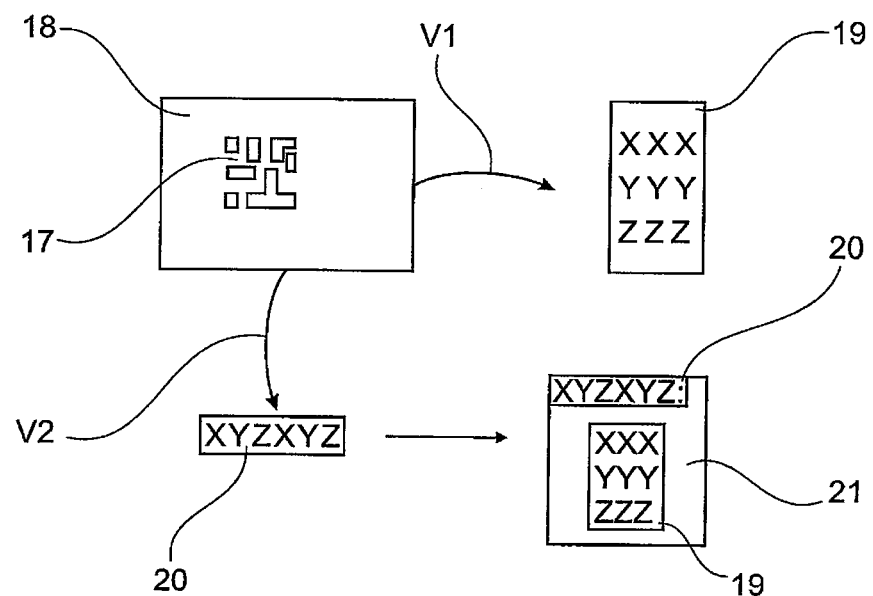
FIG. 4 shows a reading of a code.

While the camera 1 is being held in the position P11, P22, P33, in which it was positioned above the code 17, the code 17 is illuminated using the white light source 5 of the camera 1, which is indicated in FIG. 1 with a dashed line and designated B. An image 18 of the code 17 is detected by means of the detector 7 and transmitted to the arithmetic unit 6. As drawn in FIG. 4, the detected image 18 of the code 17 is read using the arithmetic unit 6, i.e., the encrypted data is obtained. According to the variant indicated with the arrow V1, the data that is read corresponds directly to the calibration data 19 of the calibration set 8. According to the variant indicated with the arrow V2, the data that is read corresponds to a code number 20 or an address in a database 21. This can also be the serial number of the calibration set 8, under which the calibration data 19 was stored in a database 21. The calibration data 19 can then be read by means of the arithmetic unit 6 or another arithmetic unit, to which the code number 20 was transmitted, using the code number 20 from the database 21.

REFERENCE NUMBERS

1 Camera
2 Handle
3 Head part
4 Exit window
5 White light source
6 Arithmetic unit
7 Detector
8 Calibration set
9 Outer calibration tube
10 Inner calibration tube
11 Calibration cover
12 Opening of the outer calibration tube 9
13 Top surface of the inner calibration tube 10
14 Longitudinal axis of the inner calibration tube 10
15 Calibration label
16 Recess of the calibration cover 11
17 Code
18 Detected image
19 Calibration data of the calibration set 8
20 Code number
21 Database
B Illumination
P1 Positions of the code 17
P2 Positions of the code 17
P3 Positions of the code 17
P11 Positioning of the camera head 3
P22 Positioning of the camera head 3
P33 Positioning of the camera head 3
V1 Reading variant
V2 Reading variant

The invention claimed is:

1. A method for reading a two-dimensional code to obtain calibration data of a calibration set using a camera for the three-dimensional optical measurement of an object using triangulation, comprising the steps of:
   moving the camera into a position at least partially in an opening or recess of the calibration set to position the camera above the two-dimensional code,
   illuminating the two-dimensional code with a white light source of the camera and capturing an image of the code by the camera; and
   reading data encrypted in the two-dimensional code from the image of the two-dimensional code using an arithmetic unit;
   wherein the data encrypted in the two-dimensional code is either calibration data coming directly from the camera or a code number for identifying the calibration data in a database.

2. The method according to claim 1, wherein the code is a binary code.

3. The method according to claim 1, wherein the code is illuminated with a pattern or with the white light source at alternating times during a recording interval and that in each case one image is captured, only images of the object illuminated with the white light source being used to read the code.

4. The method according to claim 1, wherein at least a first and a second image of the code illuminated with the white light source are captured simultaneously or successively in time, only light of a first wavelength or a first wavelength range being detected for the first image and only light of a second wavelength or a second wavelength range being detected for the second image.

5. The method according to claim 1, wherein the camera is brought into a position at a distance to an outer wall of the calibration set to position it above the code.

* * * * *